United States Patent [19]

Bunger

[11] E Re. 29,144

[45] Reissued Mar. 1, 1977

[54] AUTOMATIC CHORD AND RHYTHM SYSTEM FOR ELECTRONIC ORGAN

[75] Inventor: David A. Bunger, Cincinnati, Ohio

[73] Assignee: D. H. Baldwin Company, Cincinnati, Ohio

[22] Filed: Feb. 12, 1976

[21] Appl. No.: 657,359

Related U.S. Patent Documents

Reissue of:

[64] Patent No.: 3,918,341
Issued: Nov. 11, 1975
Appl. No.: 454,426
Filed: Mar. 25, 1974

[52] U.S. Cl. ..... 84/1.01; 84/1.03; 84/1.17; 84/DIG. 12; 84/DIG. 22

[51] Int. Cl.[2] ..... G10H 1/00; G10H 5/00

[58] Field of Search ..... 84/1.01, 1.03, 1.17, 84/1.24, DIG. 12, DIG. 22

[56] References Cited

UNITED STATES PATENTS

| | | | |
|---|---|---|---|
| 3,432,607 | 3/1969 | Bergman | 84/1.17 |
| 3,546,355 | 12/1970 | Maynard | 84/1.03 |
| 3,567,838 | 3/1971 | Tennes et al. | 84/1.01 |
| 3,590,129 | 6/1971 | Freeman | 84/1.01 |
| 3,624,263 | 11/1971 | Uchiyama | 84/1.03 |
| 3,629,481 | 12/1971 | Bunger | 84/1.03 |
| 3,708,604 | 1/1973 | Hebeisen et al. | 84/1.03 |
| 3,711,618 | 1/1973 | Freeman | 84/1.03 |
| 3,712,950 | 1/1973 | Freeman | 84/1.03 |
| 3,715,442 | 2/1973 | Freeman | 84/1.01 |
| 3,725,560 | 4/1973 | Robinson et al. | 84/1.01 |
| 3,760,088 | 9/1973 | Nakada | 84/1.03 |
| 3,763,305 | 10/1973 | Nakada et al. | 84/1.03 |
| 3,823,246 | 7/1974 | Hebeisen et al. | 84/1.17 |
| 3,842,701 | 10/1974 | Robinson et al. | 84/1.03 |
| 3,844,192 | 10/1974 | Brand et al. | 84/1.01 |
| 3,889,568 | 6/1975 | Amaya | 84/1.01 |
| R26,521 | 2/1969 | Park | 84/1.03 |

*Primary Examiner*—Stanley J. Witkowski
*Attorney, Agent, or Firm*—Kirkland & Ellis

[57] ABSTRACT

The present system provides an automatic chord accompaniment and/or an automatic rhythm system, actuation of only one left hand operated key producing proper distribution of root, third, fifth and seventh parts of a chord and root and fifth parts of a bass line. The bass and/or chord notes may be automatically rhythmically pulsed or selectively converted to a continuous mode, while the chord notes may be rhythmically pulsed to simultaneously sound different accompaniment instruments, such as guitar, piano, banjo, etc., at different rhythmic intervals, a touch bar being provided to select a minor chord when desired. A set of musical key selector buttons is provided which automatically provides seventh chords in correct positions for a given key selection. One or more accompaniment instruments may play different rhythmic sequences when seventh chords are sounded, while actuation of two or more keys, simultaneously, defeats the chord and bass accompaniment.

22 Claims, 15 Drawing Figures

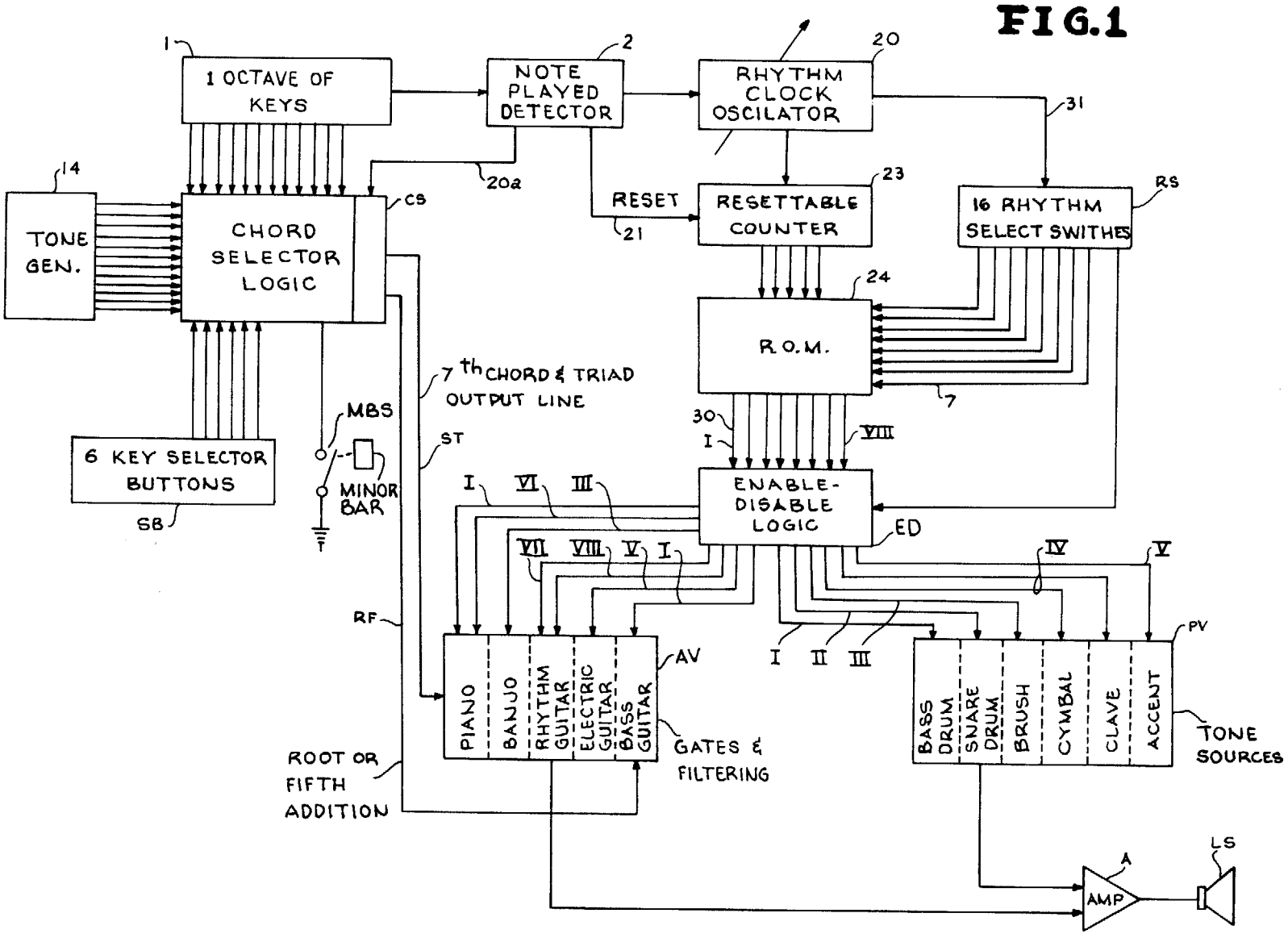
FIG.1
1 OCTAVE OF KEYS
1
NOTE PLAYED DETECTOR
2
RHYTHM CLOCK OSCILATOR
20
20a
31
16 RHYTHM SELECT SWITHES
RS
RESETTABLE COUNTER
23
RESET
21
R.O.M.
24
7
CHORD SELECTOR LOGIC
CS
TONE GEN.
14
6 KEY SELECTOR BUTTONS
SB
MBS
MINOR BAR
7th CHORD & TRIAD OUTPUT LINE
ST
ENABLE-DISABLE LOGIC
ED
VIII
30
I
II
III
IV
V
VI
VII
PIANO
BANJO
RHYTHM GUITAR
ELECTRIC GUITAR
BASS GUITAR
AV
GATES & FILTERING
RF
ROOT OR FIFTH ADDITION
BASS DRUM
SNARE DRUM
BRUSH
CYMBAL
CLAVE
ACCENT
PV
TONE SOURCES
A
AMP
LS SNARE DRUM ADD
+27V.
CONTINUOUS PIANO
A
R. GUITAR DEF
PIANO ADD
3/4 CONTROL
PIANO ADD
BANJO ADD
E. GUITAR ADD
ACC DEF
CLAVE ADD
SNARE DEF
CYM DEF
SNARE DEF
CYM DEF
CYM DEF
"W"
TO R.D.M. OF FIG.2
29
65
"Y"
"X"
131
120
108
34
67
61
59
71
63
78
77
121
MODE SELECTOR
ORGAN
WALTZ
MARCH
POLKA
BOSA NOVA
RHUMBA
LATIN III
HAWAIIAN
SOUL ROCK
POP ROCK
HOE DOWN
COUNTRY
OLD TIME WALTZ
RAGTIME
DIXIE LAND
SWINE
TROT FOX
31
"S"
100 K
100 K
100K TRUMPET
+22v
12
+27v
R400
R401
R402
Q74
R405
C404
C405
C401
C400
C402
R404
R406
R407
C403
TRUMPET
+27v
J9
10
R441
R446
R445
D79
D81
R440
R442
R447
D84
R450
C430
R443
R448
C431
D80
C429
D82
R449
R454
R473
FLUTE
SHORT SUSTAIN CKT.
FOR PERC. PATT.
NOTE PLAYED TRIG
FROM F.M. BD.
Q80
R487
Q81
R491
R492
R486
D112
D114
D113
R496
R497
500
KEY
SWITCHES
R3
R1
R2
D2
400
S1
R4
C1
D1
300
R5
KEY SWITCH COMMON
SHORT/LONG
SUSTAIN GATE
R530
R531
Q88
R533
Q87
A.S.R. LONG SUSTAIN CKT.
MATCH FIG. 13b
D128
DELAYED VIBRATO CKT.
Q107
R562
R565
+14v
Q109
R564
R566
R568
R573
+27v
R574
R563
Q108
R567
Q110
D131
R572
C471
C468
R570
C469
R571
Q111
100

AUTOMATIC CHORD AND RHYTHM SYSTEM FOR ELECTRONIC ORGAN

Matter enclosed in heavy brackets [ ] appears in the original patent but forms no part of this reissue specification; matter printed in italics indicates the additions made by reissue.

*This is an application for reissue of Pat. No. 3,918,341 issued Nov. 11, 1975, on application Ser. No. 454,426, filed Mar. 25, 1974.*

The present invention relates to an automatic chord and rhythm system in electronic organs.

Automatic chord and rhythm systems have in the past provided a complement of instruments, bass drum, snare drum, cymbal, etc., sounding as would a drummer, for a given rhythm. Little has been done for the rhythmic chord and bass accompaniment other than providing a rather simple bass-chord pattern. The present invention places emphasis on both aspects of an automatic chord-bass rhythm accompaniment device in that, for a given rhythm, a rhythm guitar, piano, electric guitar, bass guitar, bass drum, snare drum, cymbal and brush, etc., may each sound its own independent rhythmic pattern so that when combined they provide a very realistic and complete rhythm section, simulating the efforts of many musicians, and the various instruments sound as they would if musicians were playing them. This invention also provides a method by which one or more of the various accompaniment sounds (i.e., piano) plays a different rhythmic pattern than it otherwise would, when a preselected chord is sounded, greatly reducing the monotony of which prior art devices are guilty.

Most automatic chord devices provide a rather limited number of chords and do not allow one to play in all 12 musical keys. The present invention provides possible chords and allows one to play in any musical key from one octave of keys, through the use of six musical key selector buttons and a minor selection bar.

This invention is an improvement of a prior art system. In that system a clock pulse output is converted to thirty-two spatially distributed pulses which are applied to a matrix, the horizontal and vertical lines of which are selectively cross connected by FET's to provide a read only memory (ROM) for a variety of rhythms. The ROM has 64 output leads, which are connected to eight rows of rhythm select gates, the gate rows being selected by applying to them clock pulses, via one or more of eight rhythm selection switches.

SUMMARY OF THE INVENTION

An electronic organ including an automatic chord circuit providing control from an octave of keys, to provide chords in all twelve musical keys, selection of major triad or seventh chords appropriate to the selected musical key, conversion of the major triad or seventh chord to a minor chord responsive to actuation of a touch bar, in which rhythm is synchronized with and maintained by each key actuation, or in which rhythm is continuous once any key is actuated, in which one or more of the percussion voices sound in a modified rhythm when a seventh chord is sounded, in which plural chord instruments concurrently play different rhythms, in which a guitar voice is damped or undamped selectively, in which continuous chords in one voice can sound concurrently with rhythmic voices, and in which the chord logic system dissipates no power unless a key is actuated.

DESCRIPTION OF THE DRAWINGS

FIG. 1 is a block diagram illustrating the major sections and interconnections of the present invention;

DETAILED DESCRIPTION OF PRIOR ART

First describing the prior art, in FIGS. 9–12, inclusive, 24 consists of a 2048-bit read-only memory with addressing circuitry designed for musical rhythm pattern generation. The 32 × 65-bit memory array is arranged to provide a series of 32-eight-bit "words" for each of eight stored rhythm patterns. The eight bits of each word may correspond to eight percussive rhythm instruments. The 32 words are sequentially addressed by a 1-of-32 decoder which interfaces the count-address inputs to the ROM, and is included in the ROM.

The ROM 24 output is gated with a rhythm select pulse, which is switched externally to effect manual selection of one or more rhythms. This pulse strobes the output once for each count address and sets the width of the instrument trigger outputs. The select gates also perform an OR function necessary for intermixing rhythms. The output buffers are push-pull and provide low output impedance in both states.

Successive count address inputs are formed by a binary counter. When 4/4-time rhythms are desired the counter is allowed to run its full cycle. However, since 3/4-time rhythms are based on a shorter measure, four input addresses must be eliminated for each measure of these rhythms. When such rhythms are combined they both sound in 3/4-time and some events of the 4/4-time pattern are lost, but the over-all effect remains pleasant.

Figure 9:
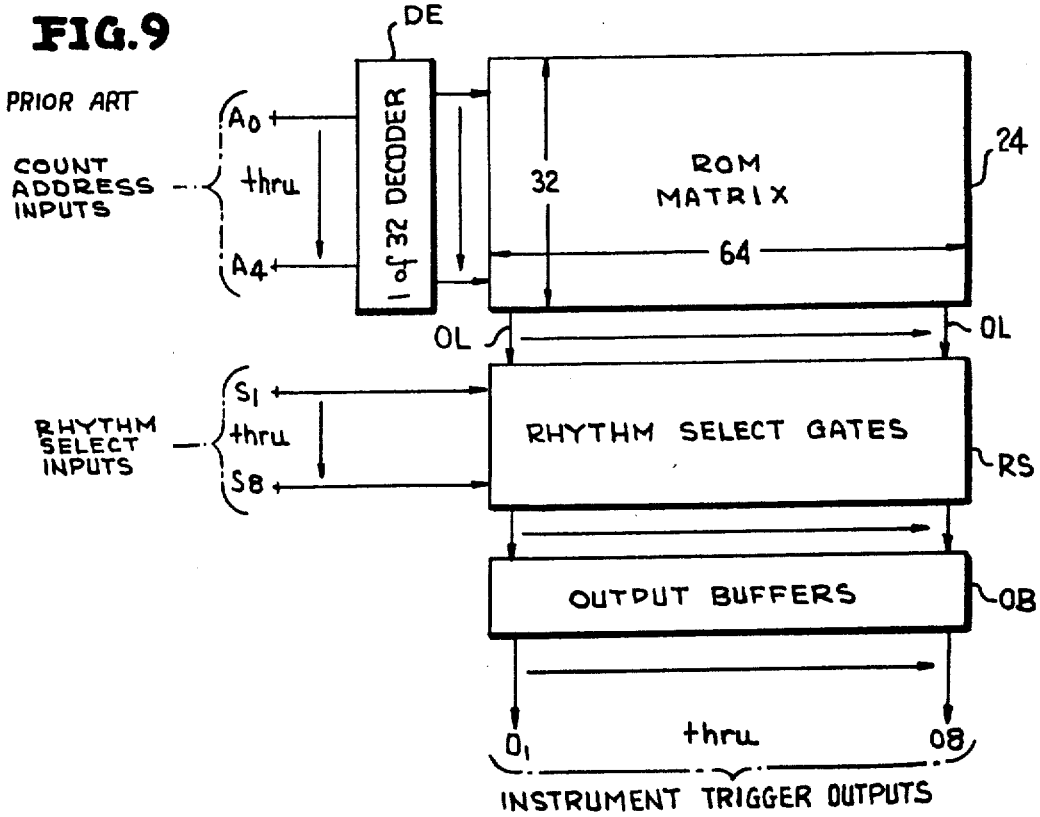
FIG. 9 is a block diagram of a prior art system, the present invention representing an improvement of the system of FIG. 9.
Figure 10:
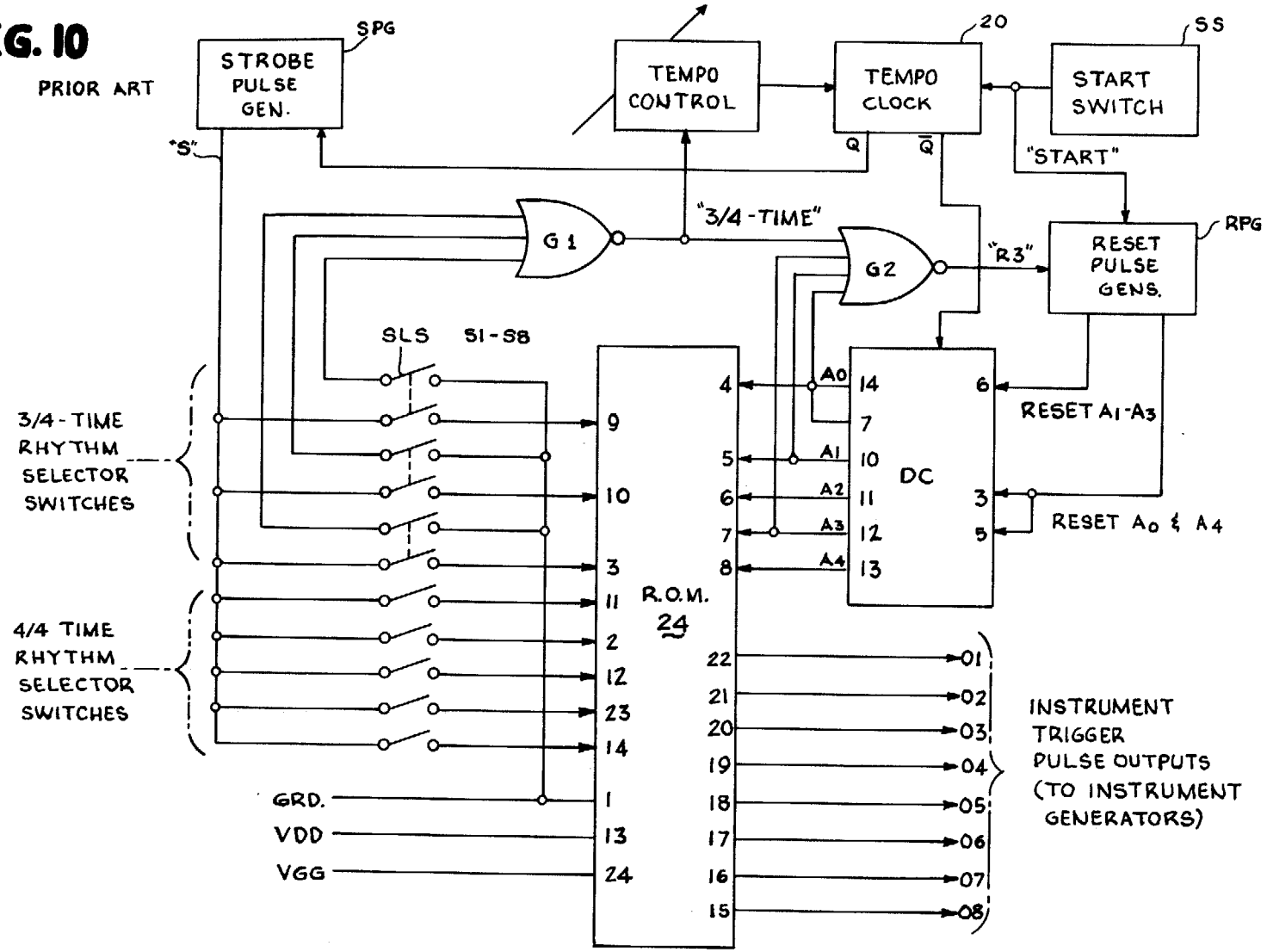
FIG. 10 PRIOR ART
FIG. 10 is an expanded block diagram corresponding with the system of FIG. 9.

FIGS. 9 and 10 represent a system block diagram of a simplified form of the invention, according to the prior art. Note that several signal connections are desgnated. These designations correlate to those shown in he system timing diagram of FIGS. 11 and 12.

When the start switch SS is depressed $V_{pp}$ is applied o the reset pulse generator RPG and the tempo clock !0. This results in resetting address signals A0 through A4 to the high level and in starting multivibrator oscilation of clock 20. The starting phase of the multivibraor is such that a strobe pulse (S) is immediately proluced by the strobe pulse generator SPG.

Strobe pulse S is applied to chosen rhythm select nputs of the ROM 24 via the selector switches SLS. Note that 3/4-time rhythms require DPST switches, whereas 4/4-time rhythms require only SPST switches. The additional switch pole for 3/4-time is used to apply . dc input (ground) to NOR-gate G1.

Gate G1 serves two purposes: (1) in conjunction with he tempo control, it slows the tempo by a fixed amount when 3/4-time is desired; and (2) in conjunction with NOR-gate G2, it enables the elimination of undesired count addresses.

The presence of the strobe pulse at any rhythm select nput (S1 through S8) results in the generation of a parallel 8-bit word at the instrument trigger outputs O1 hrough O8. The states (0's or 1's) of these outputs are letermined by the particular rhythm(s) selected, the count address, and the ROM matrix coding. If a 1 exists n the coding of a given address, a negative-going pulse vill be produced. In the FIG. 10 example, the "typical output" is produced by coding a 1 at every major count 1/4 notes) in a hypothetical rhythm.

Inputs A0, A1 and A3 to NOR-gate G2 are low when ROM rows 12 and 28 are addressed by decoder DC. If a 3/4-time rhythm has been selected the output of G1 is also low, so that the output of G2 (R3) goes high for he duration of addresses 12 and 28. When the address s advanced to 13 or 29, R3 goes low and results in the generation of a reset pulse (reset A1-A3) that effects he elimination of addresses 13 through 16 and 29 hrough 32. Conversely, if no 3/4-time rhythm has been elected the output of G1 inhibits the decoding function of G2 and the decoder DC generates the full binary sequence.

Figures 4, 12A:
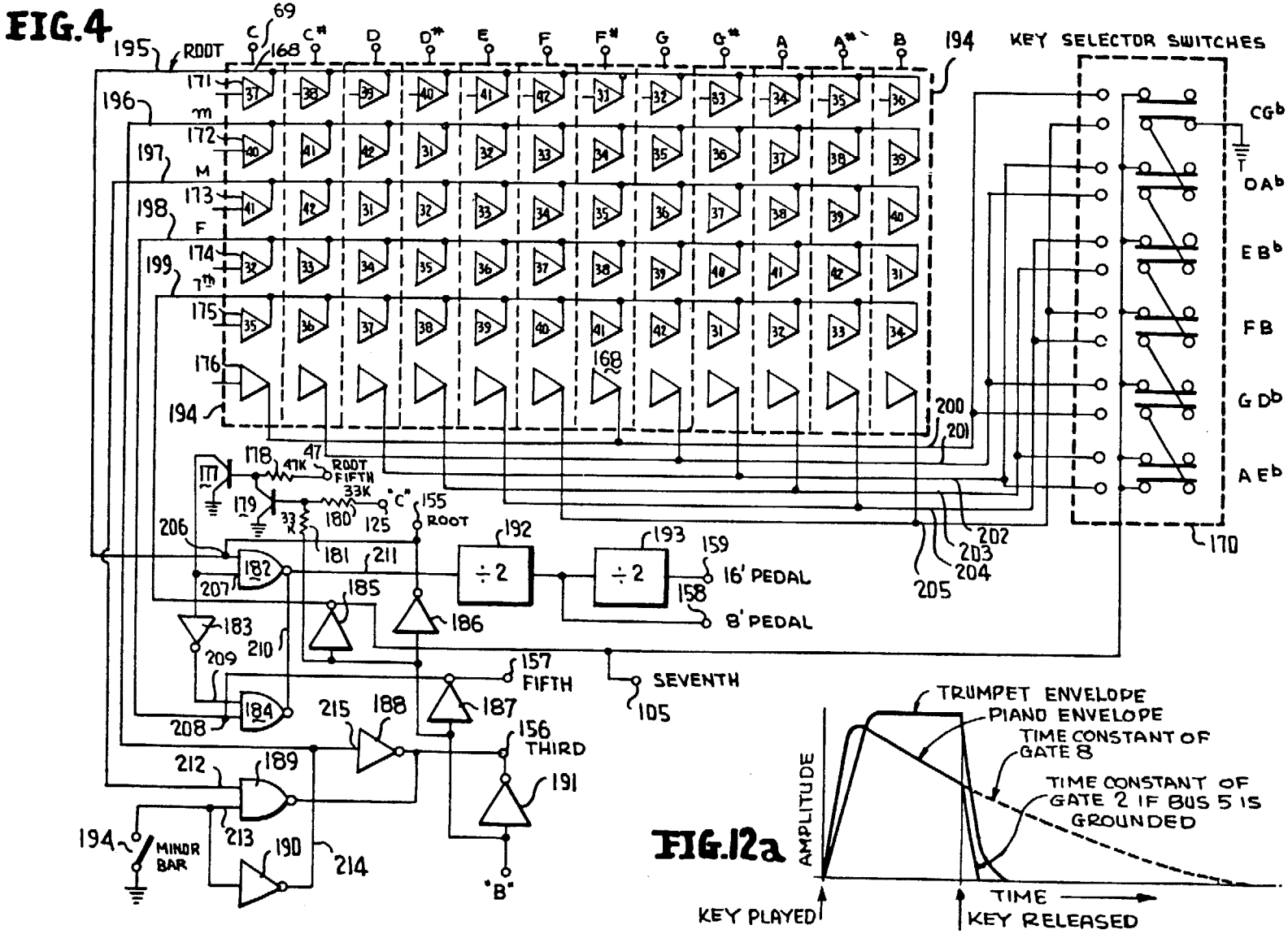
FIG. 4 is a schematic wiring diagram of chord-bass logic circuitry, and of a musical key selector switch.
FIG. 12a is a timing diagram showing decay rates for certain [ notes ] *voices*.
Figure 11:
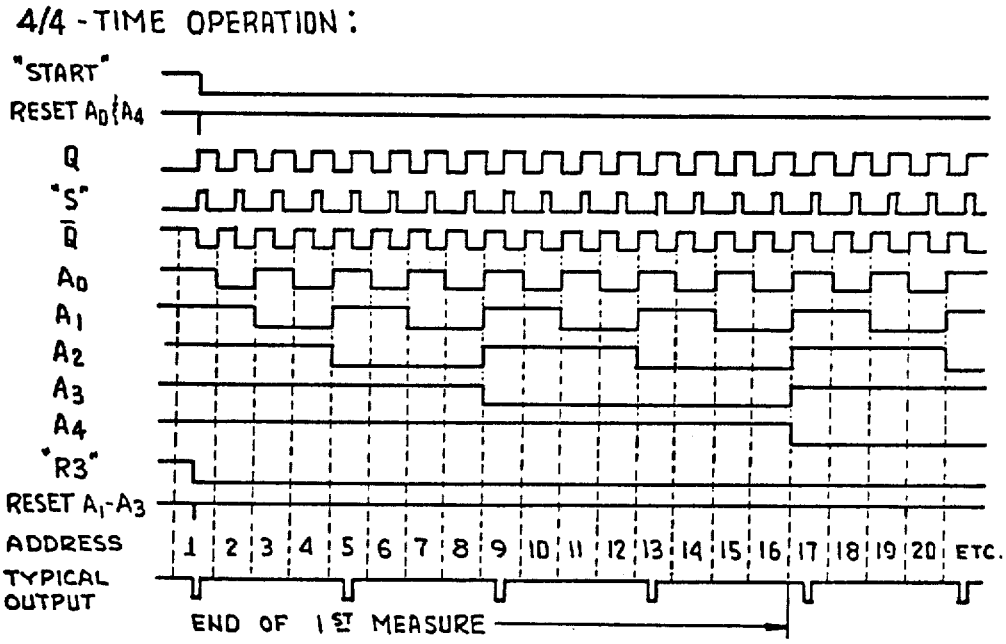
FIGS. 11 and 12 are wave form diagrams pertaining to the system of FIGS. 9 and 10.
Figure 12:
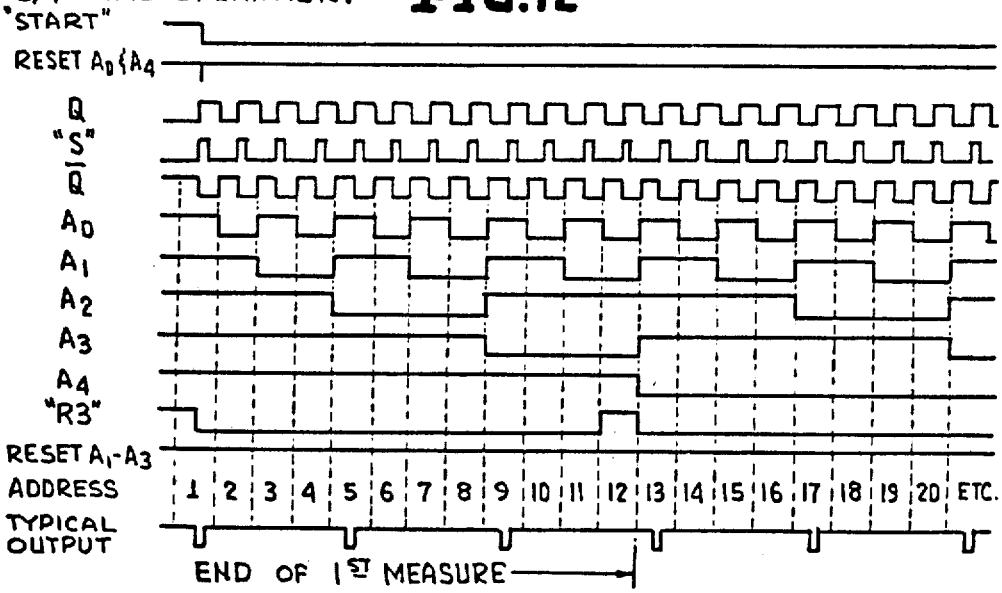

FIGS. 11 and 12 show the generation of one measure each of 3/4- and 4/4-time rhythms. The tempo clock 20 requency is shown identical for each rhythm, i.e., the empo has not been slowed by selection of a 3/4-time rhythm (as described above). While this results in different measure times, the count-rate remains unchanged. Slowing the tempo by using the output of NOR-gate G1 results in equal measure times, but different count rates. The desirability of one alternative over the other is subjective, but is readily accommodated by including or not including G1's output as a factor in controlling tempo.

While FIG. 10 shows three 3/4-time and five 4/4-time rhythms, as an example of the prior art, this selection is a matter of choice. Changes in this area affect only the number of DPST selector switches and NOR-gate (G1) nputs needed.

Gates G1 and G2 can be simple diode-logic types, followed by transistor inverters to provide the NOR function. The reset pulse generators RPG differentiate negative-going transitions provided by the start switch and G2 and apply the narrow reset pulses to the appropriate inputs of the decoder DC.

The strobe pulse gen SPG differentiates the positive-going transition of "Q" provided by the tempo clock 20. The differentiation network, which also sets the strobe pulsewidth, may be followed by a transistor amplifier to square the pulse and set the voltage levels, as is usual.

The present system uses the ROM (MCS/LSI memory) to store information about desired rhythm patterns in place of a diode matrix which was previously common. Operation begins with the actuation of a start-stop control which turns on the clock oscillator and resets the counter to the one (1) state (all outputs $A_0$ through $A_1$ equal to zero). One output of the clock is a short duration pulse (approximately 10 ms) which is selectively coupled to the rhythm select inputs of the memory device by the rhythm select switches. This signal is inverted and selectively gated by the memory, depending upon the information stored in the memory, and used to trigger the rhythm voices. It is therefore referred to as the "strobe" pulse. The second output of the clock is connected to the counter which counts clock pulses in a binary manner and provides a 5 bit binary word whose value corresponds to a particular time in the measure. Since the five binary bits have 32 different possible values, the measure can be divided into 32 discrete time intervals. This binary address activates a section of the memory which, depending upon the information stored in the memory, allows the strobe pulse applied to a rhythm select input to be inverted and coupled to any of eight outputs.

These outputs are connected to trigger amplifiers whose outputs are used to gate the rhythm voices. For some memory outputs the connection is made through a gate which allows the operator to cancel a voice from any automatic rhythm pattern. The bongo, accent, conga, bass, clave and cowbell voices consist of gated oscillators. The snare drum and cymbal voices are combinations of gated and filtered noise, and gated oscillations. The brush voice consists only of gated and filtered noise. Provision is made for triggering some voices from the accompaniment manual and the pedals of the organ. In addition to these triggers, a drum roll oscillator is provided whose output can be coupled through a switch to provide a repetitive trigger to the snare drum circuit, and a crash cymbal control is provided for random triggering of the cymbal circuit.

DETAILED DESCRIPTION

In FIG. 9, the outputs of a binary counter are represented by $A_0$–$A_4$. These are decoded in decoder DE to provide 32 spatially distributed output pulses. Since the counter is driven by a clock, the system has converted clock pulses to spatially distributed pulses. The latter pulses are applied to a matrix of the FET type, and the matrix content is read out on leads O1, there being 64 such output leads available, in the General Electric type GEM556M type ROM. These outputs are applied to rhythm select gates RS, which are selectively supplied with clock strobe pulses via selective switches S1–S8. If the S1 switch is closed, clock pulses are applied to the corresponding row of rhythm select gates, but these gates are selectively temporally conductive only according to the output pattern of the ROM. The outputs of the rhythm select gates are applied to output buffers, OB, and these supply trigger pulses to tone signal sources of a musical instrument.

Briefly describing the main features of the present invention, in FIG. 1, 16 automatic rhythms are provided and selected by a set of 16 push button rhythm select switches RS. Selecting any given rhythm automatically programs the correct rhythm, percussive and accompaniment voices for that rhythm. An MOS/LSI ROM 24 is used to store eight rhythm patterns. An adjustable rhythm clock oscillator 20 and resettable counter 23 are used in conjunction with the ROM 24 for the complete rhythm pulse generator. One output of the clock, on lead 31, is a short duration pulse selectively coupled to the rhythm select input leads of the Rom 24 through the set of 16 rhythm select switches RS. Eight instrument trigger pulse outputs, on leads I-VIII (some are duplicated) are provided by the ROM 24. Sixteen rhythms are generated from this eight rhythm capability by coupling the clock pulse on lead 31 to one or more of the rhythm select input leads, via RS, while enable-disable logic ED enables or disables certain of the eight instrument trigger pulse outputs on leads 30 to complements of percussive voices PV and accompaniment voices AV.

The rhythm percussion voices PV are generated by gated on oscillators or gated on noise from a noise generator, whenever a pulse is received from one of the trigger pulse outputs of the enable-disable logic ED. The accompaniment voices AV are developed by providing chord selector logic CS such that when one of the keys 1 is depressed, the note frequencies from generator 14 cause a [modified] chord signal to be applied to the inputs of signal gates AV. The signal gates AV are turned on whenever a trigger pulse is received from enable-disable logic ED.

ROM output line I is used to trigger the bass drum, II the snare drum, III brush, IV cymbal-clave and line V accent. Line I is also used to trigger a bass guitar voice and a piano voice whenever a seventh chord is sounded, as will be described in detail later. Line III also triggers a banjo voice. Line V also triggers an electric guitar voice. Line VI triggers a piano voice, line VII rhythm guitar and line VIII provides damping information for the rhythm guitar voice.

Included with the gates AV is filtering for each respective voice. The outputs of gates AV and tone sources PV are fed to amplifier A and loudspeaker LS.

A set of six key selector buttons Sb determines which keys 1 when depressed will provide a seventh chord on output line ST. Output line ST will represent either a major triad or a dominant 7th chord. If minor bar switch MBS is closed a minor triad or minor 7th chord will be applied to output line ST.

Through this arrangement 48 possible chords are provided and the musician is allowed to play in any of the 12 musical keys. Output line RF will provide either root or fifth bass frequencies to the bass guitar gate and filter contained in AV.

Note played detector 2 detects when any of keys 1 is depressed and starts rhythm clock 20. Line 21 provides information to counter 23 to assure the rhythm will start on the downbeat. Line 20a allows chord logic CS to provide an output on lines RF and ST when a key is played.

In this mode of operation everything is initiated and synchronized with the playing of a note. Another mode of operation allows the rhythm clock 20 to run continuously even if a key is not depressed, so that the rhythm percussive voices will sound independently of whether or not a key is played. The chord selector logic CS is still controlled by line 20a which allows output signals on line RF and ST only when one key is depressed. If two notes are played the chord selector logic CS is defeated and no output will appear on lines RF or ST. Depending on the mode of operation the playing of two keys will stop the clock oscillator 20 or have no effect.

The enable-disable logic ED applies the eight output pulses from ROM 24 to gates AV and tone sources PV as a function of which rhythm selector switch RS is depressed, so that the appropriate complement of voices is sounded for the selected rhythm.

Objects of the present invention are as follows:

1. Provide an automatic chord attachment for electronic organs in which a maximum number of chords are available from one octave range of keys, with a minimum number of controls. Each key represents the root note of the chord sounded.

2. Provide all chords necessary to play in all twelve musical keys.

3. Provide a set of musical key selector buttons which automatically provides major triad and 7th chords which are appropriate to the selected musical key.

4. Provide a system in which a major triad or 7th chord is always sounded for each root note played and which provides a touch bar mechanism for converting to a minor triad or minor 7th chord.

5. Provide a system in which rhythm percussion and rhythm accompaniment are synchronized with the playing of a key to start on the downbeat and stop when the key is released, and which provides a mode button which will allow the rhythm percussion to run continuously once started by the playing of a key while the rhythm accompaniment remains a function of whether a key is depressed and means for stopping the rhythm percussion from a kick switch located on the expression pedal of the organ.

6. Provide a system in which one or more of the rhythm accompaniment voices sounds a modified rhythm whenever a 7th chord is sounded.

7. Produce sixteen rhythms from an eight input rhythm select device.

8. Provide a system in which different rhythm accompaniment sequences sound simultaneously.

9. Provide a system which has a pulse line for triggering a guitar voice and a pulse line for damping the guitar voice, allowing a realistic simulation of the sound of a guitar as actually played.

10. Provide a system which has an organ mode of operation in which the chord and pedal (root) will sound continuously when a key is depressed unless a rhythm button is depressed, in which case the pedal will play (root-fifth) rhythm of the given rhythm selected. Voicing of continuous chord will also be affected by what rhythm is selected. Continuous chord can sound simultaneously with other rhythm accompaniment voices sounding rhythmically.

11. Provide an integrated circuit chord logic design which dissipates no power unless a key is depressed.

Figure 2:
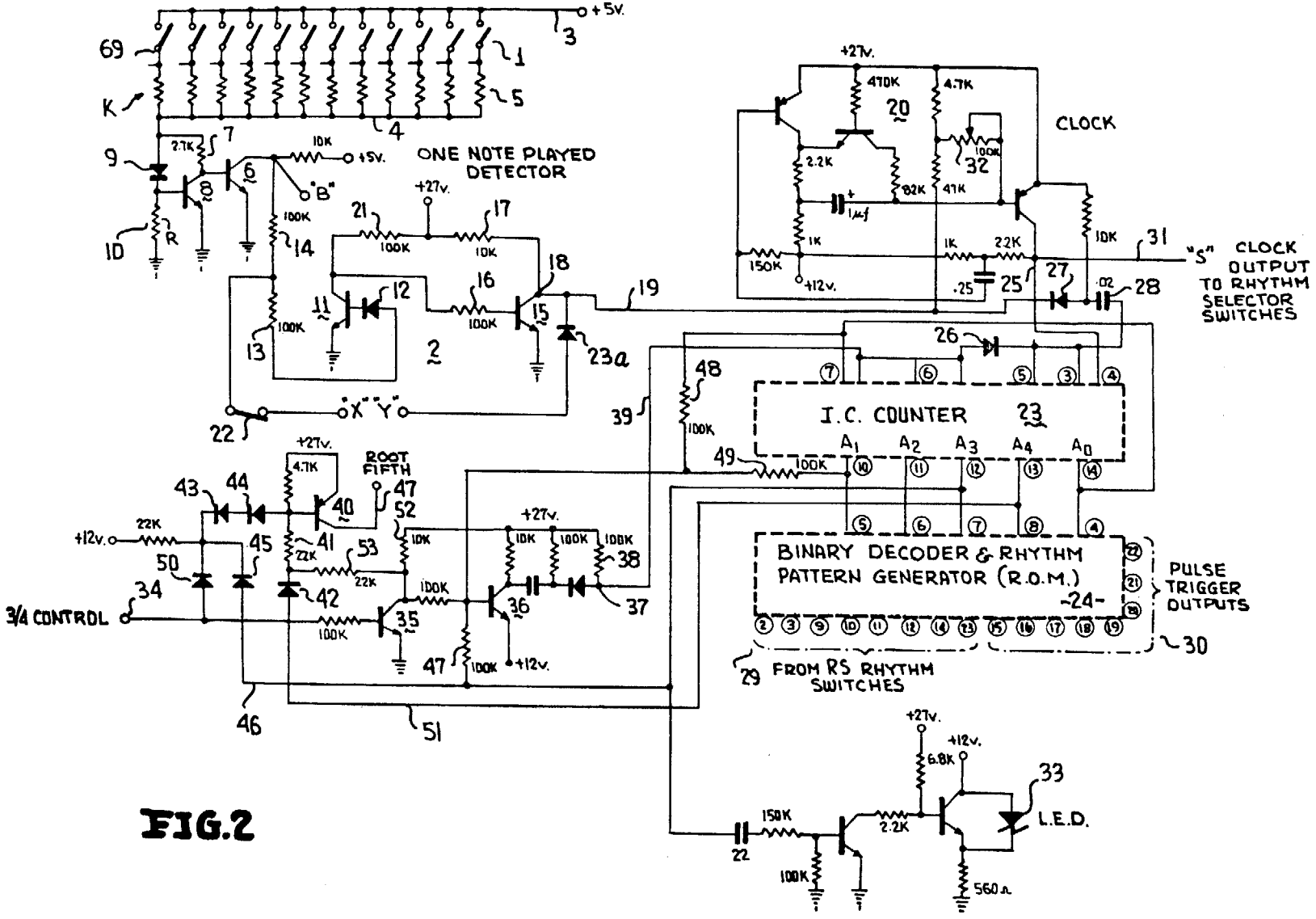
FIG. 2 is a schematic wiring diagram of the pulse generator system and associated control circuitry of a preferred embodiment of the present invention.

Referring now more specifically to FIG. 2 of the accompanying drawings, there is illustrated, among other things, a tempo clock oscillator 20, counter 23 and ROM 30 employed to provide an automatic rhythm generator forming a part of the apparatus of the invention. Also shown is an octave of keys 1 and note played detector circuitry 2. One side of the keyswitches 1 [are] *is* tied to a common +5V bus 3, the other side of the keyswitches 1 [are] *is* tied to a common bus 4 via resistors 5. Thus whenever one or more keyswitches are closed a plus voltage appears on bus 4. With one keyswitch closed base bias voltage is applied to transistor 6 via resistor 7 turning transistor 6 on and causing point "B" to be grounded. Base bias is also supplied to transistor 8 via diode 9, but resistor 10 is selected such that the voltage developed at the base of transistor 8 is not enough to saturate it. Thus with one keyswitch 1 closed transistor 8 remains in an off condition. However, when two or more keyswitches 1 are closed enough bias voltage is developed across resistor 10 via diode 9 to cause transistor 8 to turn on, shunting the bias current to transistor 6 via resistor 7 to ground, turning transistor 6 off and allowing point B to rise to +5V. Thus the only time point B is grounded is when only one keyswitch is closed and this is the condition which is used to synchronize the entire operation of the present system. When point B is positive, base bias is supplied to transistor 11 via diode 12 and resistors 13 and 14 causing the collector of transistor 11 to be grounded. With transistor 11 saturated no base bias to transistor 15 via resistor 16 is available, thus transistor 15 is off, and +27V appears at its collector 18 via resistor 17. The +27V at 18 is applied via lead 19 to clock oscillator 20 preventing the clock from running. When a keyswitch is closed, point B becomes grounded, transistor 11 turns off because no base bias is now available. When transistor 11 turns off, bias is supplied to transistor 15 via resistors 16 and 21 causing the collector 18 of transistor 15 to become grounded. When lead 19 becomes grounded the clock oscillator is turned on, and will continue to run as long as the collector 18 of transistor 15 remains at ground. This condition will exist as long as only one keyswitch 1 is closed. As soon as the keyswitch 1 is opened or two or more keyswitches are closed point B becomes +5V, the collector 18 of transistor 15 becomes +27V and the tempo clock 20 stops. This is defined as the synchronous mode of operation. Points X and Y are connected to a mode selector switch in FIG. 5. With points X and Y open the synchronous mode is selected. If X and Y are tied together via the mode selector switch a continuous mode of operation is allowed. With X and Y tied together, once the clock oscillator is started by points B and 18 becoming grounded the junction of resistors 13 and 14 is connected via switch 22, which is normally closed, via X - Y and diode [23] *23a* to the collector 18 of transistor 15. When point B now becomes +5V upon release of the played key transistor 11 will not turn on because its base bias is now shunted to ground via switch 22, X - Y, diode [23] *23a* and transistor 15 whose collector 18 is at ground potential. Thus transistor 11 wll remain off and transistor 15 will remain on, and the clock oscillator will continue to run. This condition will exist regardless of any keyswitch 1 operating. The clock oscillator will continue to run until such time that with no keyswitch closed either switch 22 or switch X - Y is momentarily opened. Opening of either of these switches and with point B at +5V (no note played) bias will again be supplied to transistor 11 which in turn causes the collector 18 of transistor 15 to become +27V and causes the clock oscillator to stop. Switch 22 may be located on the expression pedal of the instrument so that this operation can be readily performed.

Whenever line 19 becomes ground, which starts the clock oscillator, the I.C. counter 23 is reset to the downbeat condition. When line 19 is shunted to ground a negative pulse is applied via diode 27 and capacitor 28 to reset terminals 3 and 5 and via diode 26 to reset terminal 6, causing the outputs on terminals 10, 11, 12, 13 and 14 of counter 23 to be set to +27V. Terminals 10, 11, 12, 13 and 14 of counter 23 are connected to address input terminals 5, 6, 7, 8 and 4, respectively, of ROM 24. This sets the ROM 24 to the condition which is necessary at the beginning of a measure. A pulse output from the clock 20 is applied to input terminal 4 of counter 23 via line 25. Counter 23 then counts clock pulses in a binary manner and provides a five bit binary coded output on terminals 10, 11, 12, 13 and 14 of counter 23, whose value corresponds to a particular time in the measure. The five binary outputs have 32 possible values. The system is arranged in a two measure manner so that each measure contains sixteen discrete time intervals.

The binary address of counter 23 activates a section of the memory of ROM 24 which allows a strobe pulse coupled to one of the input terminals 29 of ROM 24 to be coupled to the output terminals 30. Depending on what information has been stored in the memory of ROM 24 a set of spatially distributed output pulses will appear on each output terminal 30. The pulse distribution present on each output terminal is a function of which input terminal 29 is supplied with a strobe pulse from the clock oscillator 20 via the rhythm selector switches of FIG. 5. Clock oscillator 20 provides a strobe pulse S to the rhythm selector switches via lead 31. The ROM outputs 30 are gated with this strobe pulse when applied to one of inputs 29. This pulse strobes the output once for each count address and sets the width of the instrument trigger outputs 30.

The clock oscillator 20 is a gated on multivibrator, whose frequency (tempo rate) is controlled by adjustable resistor 32, and provides a ten millisecond pulse at its output terminal 31.

Output terminal 12 of counter 23 provides a positive going step every sixteeen counts. The positive voltage step is used to pulse a downbeat light emitting diode 33.

When 4/4 time rhythms are desired the counter 23 is allowed to run its full cycle of 32 counts. However, since 3/4 time rhythms are based on a count system divisible by three, the counter must be converted to a 24 count system when 3/4 time rhythms are desired. This provides two measures of twelve counts each. This is done by eliminating the last four counts in each of the sixteen counts of 4/4 time. This arrangement facilitates the mixing of 3/4 and 4/4 time rhythms. When such rhythms are combined they both sound in 3/4 time.

In 4/4 time no voltage is applied to terminal 34, thus transistor 35 is off and transistor 36 is on. Point 37 is held at +27V via resistor 38 and no information is fed via line 39 to reset pin 6 of the counter 23. For this condition the complete thirty-two counts of the system [ is ] *are* obtained. Transistor 40 receives information from pin 12 of counter 23 via lead 46, diode 45 and diodes 43 and 44. Terminal 12 is +27V for the first eight counts and +12V for second eight counts of each measure.

In this respect the counter 23 is a conventional binary counter in which the stages have +27V on their output leads when off and +12V when on, and the binary output pulses are combined in binary decoder 24 to provide 32 counts, in conventional fashion.

Thus for the first half measure transistor 40 is off and then turns on for the last half of the measure supplying +27V to the root-fifth control line 47. The root-fifth control line is connected to the chord-bass logic circuitry as shown in FIG. 4, and will be explained later.

When 3/4 time is selected, +27V is applied to terminal 34 which turns transistor 35 on and the state of transistor 36 now becomes a function of the binary state of pins 10, 12 and 14 of counter 23 via resistors 49, 47a and 48, respectively. As long as any of these output pins are at +27V transistor 36 will be saturated. When all three outputs are at +12V transistor 36 will turn off. When one of these outputs returns to the +27V state, transistor 36 will again turn on causing a negative transient to appear on line 37, which is tied to reset pin 6 of the counter causing the counter to be reset to the downbeat condition. This will occur after the twelfth beat of each measure which in effect eliminates the 13, 14, 15, 16 counts of the first measure and the 29, 30, 31, 32 counts of the second measure, giving the twelve count per measure desired for 3/4 time. When +27V is applied to terminal 34 diode 50 prevents transistor 40 from being controlled from the counter via lead 46. Transistor 40 is now controlled from pin 13 of the counter via lead 51, diode 42 and resistor 41 such that transistor 40 is turned on only for the second measure in 3/4 time. The path from lead 51 is defeated in 4/4 time by appling +27V via resistors 52, and 53 to the junction of resistor 41 and diode 42.

Figure 3:
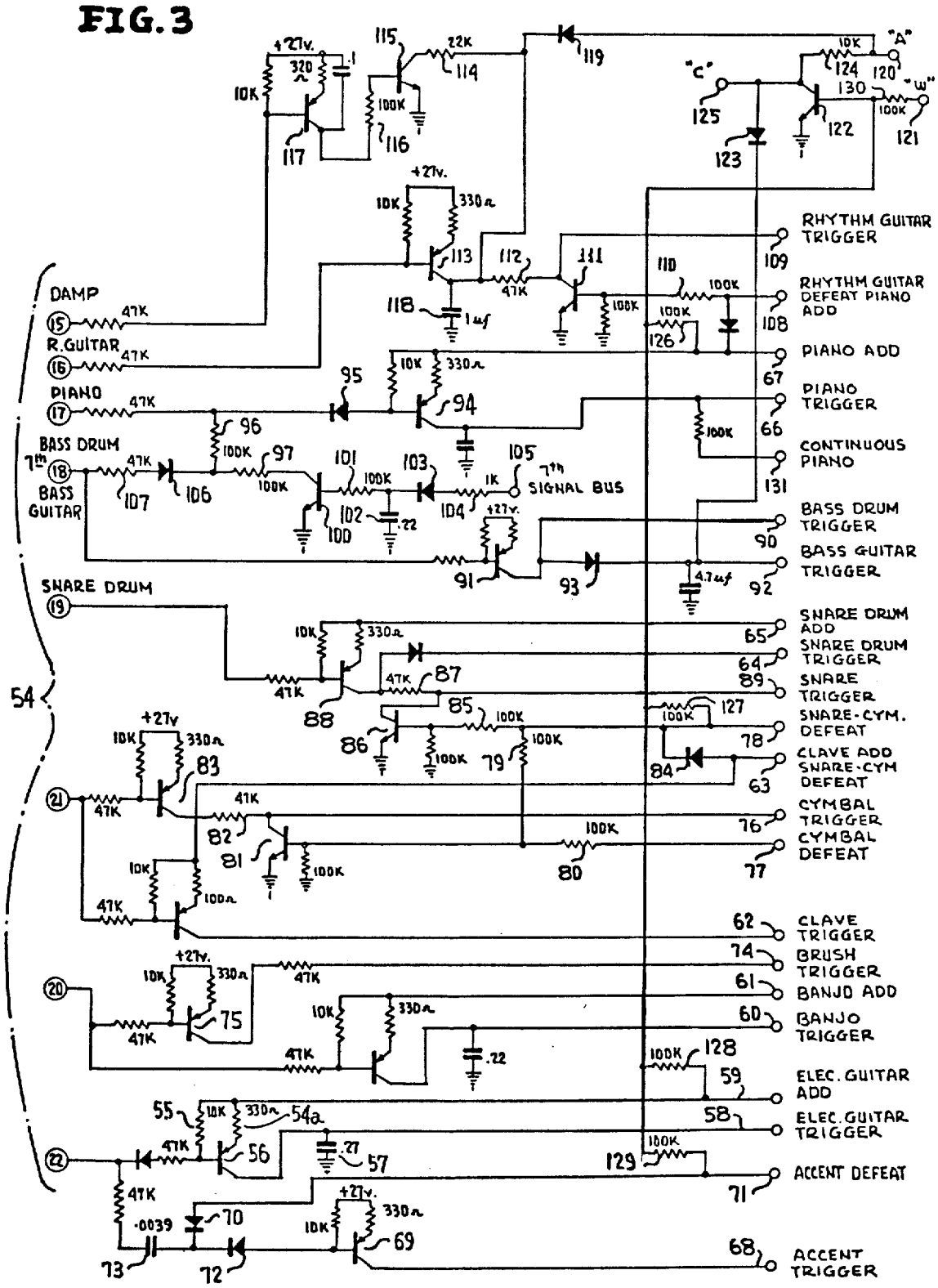
FIG. 3 is a schematic wiring diagram of enable-disable trigger pulse logic, employed in the system of FIG. 1.

The eight pulse trigger outputs 30 of the ROM are applied to terminals 54 and then to the enable-disable pulse trigger logic circuit as shown in FIG. 3. This circuitry allows the pulses appearing at 54 to be applied or defeated to the various voices as a function of what rhythm switch is operated in FIG. 5. Each rhythm switch when selected performs two functions. It applies the strobe pulse s to one of the rhythm select pins 29 of ROM 24 in FIG. 2. It also applies +27V via a diode and resistor matrix to the enable-disable logic circuitry in FIG. 3. Thus when a rhythm is selected and the clock oscillator is caused to run pulses will be applied to terminals 54. In each case the pulses are applied to the bases of PNP transistors. Each pulse goes negative from 30 27V to +12V and is ten milliseconds wide. For example, if the emitter resistor 54a and base bias resistor 55 [has] *have* +27V applied to them via lead 59, the PNP transistor 56 will turn on when a pulse is applied to its base charging the sustain capacitor 57 with a positive voltage for ten milliseconds. The voltage on capacitor 57 then decays away exponentially. For this example the voltage on capacitor 57 is applied via lead 58 to an electric guitar signal gate.

If no voltage is present on lead 59, no pulse signal will appear on lead 58. In this manner various voices are allowed to speak as a function of the rhythm selected. This arrangement, along with the ability to intermix rhythms, allows the present system to be expanded from eight rhythms to 16 rhythms, without a corresponding expansion of ROM capacity.

In a similar manner, where +27V is selectively applied to the emitters of the PNP transistors when a given voice is desired to be sounded, the following voices are controlled: electric guitar trigger 58 by lead 59, banjo trigger 60 by lead 61, clave trigger 62 by lead 63, snare drum trigger 64 by lead 65 and piano trigger 66 by lead 67.

The accent trigger on lead 68 is provided by transistor 69 whose emitter and base resistors are permanently tied to +27V. The accent trigger on lead 68 is thus present unless +27V is applied to accent defeat lead 71 and to the junction of diode 72 and capacitor 73 via diode 70. This prevents a negative pulse from the ROM at terminal 22 from being applied to the base of transistor 69, and thus no trigger pulses will appear on lead 68. The brush trigger lead 74 has pulses applied via transistor 75 whenever pulses appear on terminal 20 since there is no add or defeat type function associated with transistor 75.

Cymbal trigger lead 76 is supplied with pulses via resistor 82 and transistor 83. If transistor 81 is turned on, lead 76 will be grounded and no pulses will appear on trigger lead 76. Transistor 81 can be turned on by applying +27V to lead 77, or lead 78, or lead 63. Lead 77 saturates transistor 81 via resistor 80 and lead 63 saturates transistor [51] *81* via diode 84 and resistor 79.

In a similar manner pulses on snare trigger lead 89, supplied via resistor 87 and transistor 88 if +27V is applied to lead 65, can be defeated by transistor 86.

Transistor 86 will saturate whenever +27V is applied to terminals 63 or 78. The bass drum trigger lead 90 and bass guitar lead 92 via diode 93 will have pulses supplied to it via transistor 91 as long as pulses appear on ROM terminal 18.

Pulses on terminal 18 can also trigger transistor 94 which subsequently supplies a pulse to piano trigger lead 66. Transistor 94 can be triggered from terminal 18 via resistor 107, diode 106, resistor 96 and diode 95 if +27V is applied to piano add terminal 67 and transistor 100 is turned on. Thus, when a piano voice is selected by applying +27V to lead 67 the piano trigger line 66 is capable of having the spatially distributed sum of the pulses appearing on ROM terminals 17 and 18. This will be true when a seventh frequency signal is applied to terminal 105 which is detected by resistor 104, diode 103 and capacitor 102, which develops a d.c. bias for transistor 100 via resistor 101. If no signal is present on terminal 105, transistor 100 is off preventing transistor 94 from being pulsed from terminal 18. Transistor 94, however, still continues to be pulsed from terminal 17. Thus the piano trigger line 66 will have a set of pulses which are a function of whether a seventh frequency signal is available.

When the seventh signal is present line 66 will contain the spatial sum of pulses of terminals 17 and 18 and when seventh signal is not present line 66 will contain only the pulses present on terminal 17. By this method the rhythmic line sounded by the piano voice changes whenever a seventh chord is sounded. This effect adds realism to the overall rhythmic effect and greatly reduces the monotony which is characteristic of previous automatic accompaniment devices.

In a manner similar of that described earlier rhythm guitar trigger line 109 will have pulses present via resistor 112 and transistor 113 if pulses are present on ROM terminal 16, and no voltage is present on line 108, causing transistor 111 to be off and allowing the pulses to pass to line 109. Every time transistor 113 is pulsed sustain [capacity] *capacitor* 118 is charged for 10 [.] ms and then discharges exponentially. This causes the rhythm guitar voice to be sounded with a fixed length of sustain. An additional circuit is provided, consisting of transistors 117 and 115 and associated circuitry, such that whenever a pulse is present on ROM line 15 transistor 117 turns on which turns transistor 115 on via resistor 16. When transistor 115 is on sustain capacitor 118 has an additional discharge path through resistor 114. Thus the guitar voice can be sounded with two distinct lengths of sustain by the appropriate pulse distributions present on terminals 15 and 16. For example, a pulse may appear on terminal 16 on the downbeat of a measure causing the guitar voice to sound and sustain with a relatively long time constant appropriate for a guitar voice. One quarter note later another pulse may appear on terminal 16 causing the guitar voice to be triggered again. However, a sixteenth note after this second pulse a pulse may appear on terminal 15 causing the sustain capacitor 118 to be discharged at a substantially faster rate, through transistor 115 and resistor 114, than normal. This simulates the effect of strumming a guitar and then damping the strings. This unique method of simulating a guitar voice adds greatly to realism.

Figure 5:
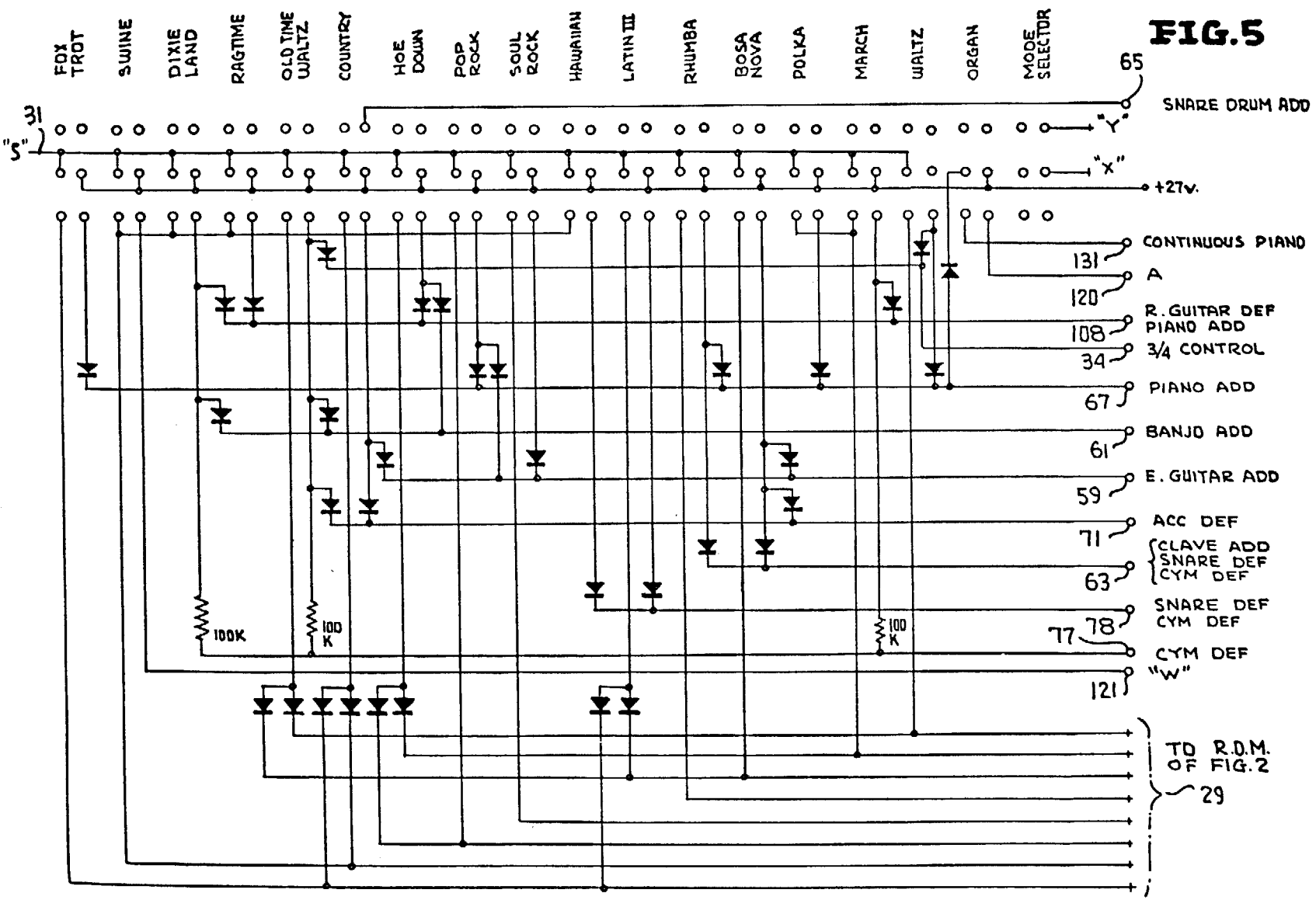
FIG. 5 is a circuit diagram of rhythm selector switches.

When the organ switch in FIG. 5 is closed +27V is applied to terminal 120. If no rhythm button is selected and a key is played the guitar voice will sound a continuous chord due to +27V present on terminal 109 via resistor 112 and diode 119. In addition the bass guitar voice will sound a continuous root tone of the depressed key due to +27V being applied to terminal 92 via diode 123 and resistors 124.

If in addition to the organ switch a rhythm switch is operated transistor 122 is turned on due to bias current via one of the following resistors 130, 126, 127, 128 or 129.

With transistor 122 saturated no voltage appears at bass guitar terminal 92 because the junction of diode 123 and resistor 124 is shorted to ground via the collector of transistor 122. This allows the bass guitar to return to the playing of a rhythmic pattern instead of a continuous sound.

Depending on which rhythm switch is operated the continuous guitar voice may or may not be defeated, and a continuous piano voice may sound depending on whether or not +27V has been applied to terminals 108, 131 or 67, as previously described. Thus depending on what has been programmed by the matrix of FIG. 5 the guitar voice, or the piano voice, or both, may sound in a continuous fashion. In addition, depending on the rhythm selected the banjo and electric guitar may play a rhythmic sequence. The rhythm percussion voices, brush, bass drum, snare drum, etc. will still play the rhythm which has been selected. If in addition to the organ switch no rhythm switch is closed the rhythm percussion voices will not sound. By this arrangement, the use of one organ mode button can provide a wide variety of combinations in sound.

Terminal 125 supplies +27V to the chord logic circuitry of FIG. 4 so that when the bass guitar sounds continuously only the root tone is allowed, whereas when the bass guitar plays rhythmatically a root-fifth sequence is allowed.

Thus through the use of the diode resistor matrix in FIG. 5 and the enable-disable logic of FIG. 3 a wide variety of rhythms and effects [ are ] *is* obtained from a ROM limited to eight rhythms and eight voices.

By operating various of the switches in FIG. 5 in combination as even wider variety is obtainable.

Figure 7:
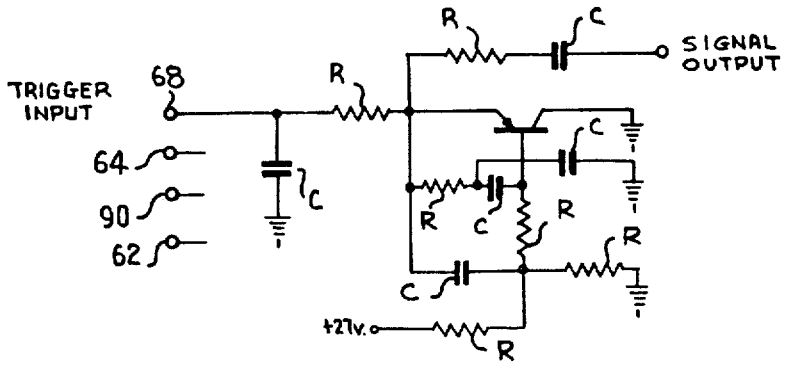
FIG. 7 is a schematic circuit diagram of a representative rhythm voice.

FIG. 7 is a typical circuit arrangement for obtaining various rhythm percussion voices through the use of gated on oscillators. By proper selection of resistor and capacitor values, the circuit can be caused to oscillate at a given frequency and for a given length of time for simulating a given percussive tone.

Figure 8:
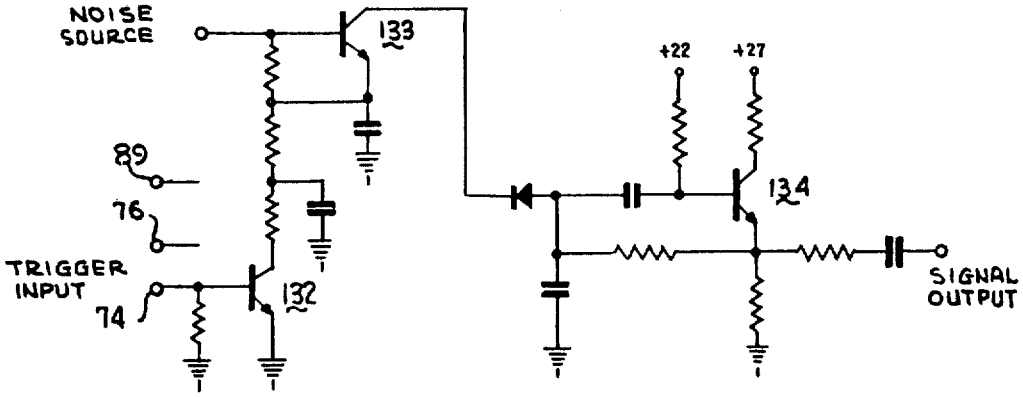
FIG. 8 is a schematic circuit diagram of a representative rhythm voice derived from gating on noise.

FIG. 8 is a typical example of a circuit used for obtaining percussive sounds which are developed through the use of gated on noise such as brush, cymbal, etc. Transistors 132 and 133 form the gate and transistor 134 in conjunction with associated circuitry forms a conventional active filter for obtaining the desired sound.

The circuits of FIGS. 7 and 8 receive their respective pulses from the logic of FIG. 3 and have numbered terminals corresponding with those in FIG. 3.

Figure 6:
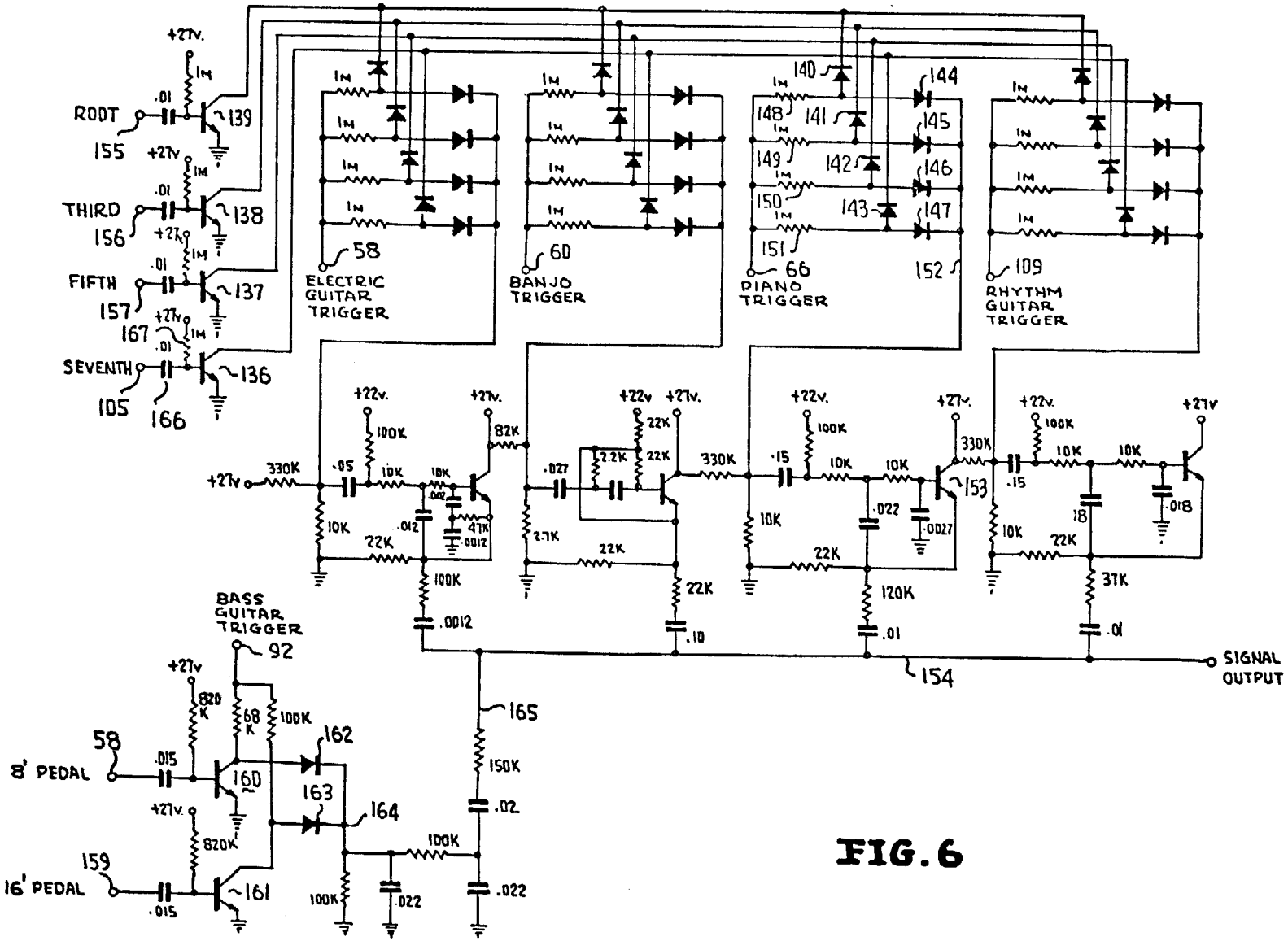
FIG. 6 is a schematic circuit diagram of chord and bass signal gates and associated filters.

FIG. 6 shows the signal percussion gates and active filters associated with the generation of the electric guitar, banjo, piano, rhythm guitar and bass guitar voices.

Square wave frequencies of a given chord are applied to terminals 105, 155, 156 and 157. The capacitor 166 and resistor 167 convert the square wave input to a pulse waveform at the collector of transistor 136 when the collector is supplied with voltage from one or more of the instrument trigger inputs, such as at 66. Transistors 137, 138 and 139 operate in a similar manner. The square waves are converted to pulse waves because signals rich in all harmonics are desirable for application to the various active filters in simulating the various instrument sounds.

Frequency signals from FIG. 4 are present at the input terminals 105, 155, 156 and 157 only when one key is played.

Assume signals are present at these inputs and the piano trigger line is being pulsed rhythmatically with a percussive envelope which is generated in the circuit of FIG. 3. The seventh signal present at the collector of transistor 136, for example, is coupled to output bus 152 through the diode gating action of diodes 143 and 147 and bias resistor 151 with the percussive envelope of that which is present on lead 66. In a similar manner the other chordal frequencies are gated to bus 152 through their respective diode gates. The signal present on bus 152 is applied to the active filter composed of transistor 153 and associated circuitry and then to the signal output bus 154. The electric guitar, banjo, and rhythm guitar gates operate in an identical manner.

8' and 16' bass frequency square waves are applied to transistors 160 and 161, respectively, and converted to pulse waves.

When terminal 92 is pulsed with a percussive envelope the bass signals appear on bus 164 via diodes 162 and 163. This signal is then filtered and passed to the signal output via lead 165.

Referring to FIG. 4, when a key switch is closed, for example the C note key switch, +5V is applied to terminal 69 shown in both FIGS. 4 and 2. Terminal 69 represents the supply voltage terminal of an integrated circuit pack 194 which contains six inverters (with open collector output) shown as 171 through 176. There are twelve I.C. packages 168, one for each key note designation C through B. All twelve I.C. packages are normally inoperative until a key switch is closed and +5V supplied to the associated I.C. package. Five of the six inverters of each package has an appropriate chordal frequency applied to its respective input. For example, circuit pack 168 associated with key switch C has a C frequency applied to the input of inverter 171, D # applied to 172, E applied to 173, G applied to 174 and an A # applied to 175. These frequencies represent the root, minor third, major third, fifth, and seventh chordal components for a C chord necessary for constructing major triads, minor triads, dominant sevenths and minor sevenths. The sixth inverter of each package such as 176 is used in conjunction with key selector switch 170 for automatically programming seventh chords.

All inverters which are associated with the root note of a given chord have their outputs wired to bus 195.

Those inverters associated with minor third note have their outputs wired to bus 196.

In a similar manner buses 197, 198 and 199 represent major third, fifth, and seventh, respectively. If no key switch is closed no signals will appear on buses 195 through 199 because no I.C. package has supply voltage provided. Because each inverter is of the open collector type their outputs can be "OR" wired to a given bus as described and will provide no signal to that bus until provided with supply voltage.

Assume key switch C is operated, +5V applied to terminal 69 buses 195 through 199 will contain appropriate signals for chord construction as previously described. Buses 195 through 199 are tied to additional logic circuitry. Bus 195 is tied to one input 206 of a two-input positive NAND gate 182 (with open collector) and also to root terminal 155. Bus 198 is tied to one input 208 of NAND gate 184, and fifth terminal 157. The outputs of 182 and 184 are "OR" wired via lead 210 and applied to divider 192 via lead 211. Lead 211 will have a root or fifth signal applied to it via NAND gates 182 or 184 depending upon whether (root-fifth) terminal 47 has voltage applied to it. With no voltage on terminal 47 transistor 177 is off, and input terminal 207 of NAND gate 182 is open, allowing the signal on input 206 to appear on lead 211 via 182. The input to gate 183 is also open causing its output to be grounded, grounding input terminal 209 of NAND gate 184 and causing its output to be open. Since 209 is grounded the signal appearing on 208 is prevented from being gated to lead 211 via NAND gate 184. Thus lead 211 will contain only the foot note frequency. When positive voltage is applied to terminal 47 transistor 177 will saturate if transistor 179 is off. This grounds the input 207 of NAND gate 182 and also the input to gate 183. The signal on input 206 is now prevented from appearing on lead 211 via 182. With the input of gate 183 grounded its output is open and input terminal 209 of NAND gate 184 is open allowing the signal on input 208 to appear on lead 211 via 184. Thus lead 211 will contain only the fifth note frequency. Signal appearing on lead 211 is applied to divider 192 and then to divider 193 to provide bass frequencies on terminals 158 and 159. The frequencies on 158 and 159 are then applied to bass guitar gating in FIG. 6 such that when a bass guitar trigger is received bass guitar root-tone or a fifth tone will be sounded. Thus the voltage on terminal 47 of FIG. 4 determines whether a root tone or a fifth tone will be sounded in the bass register. The voltage on terminal 47 is a function of the counter circuitry in FIG. 2 as previously described.

When the organ mode selector button is on voltage will be applied to terminal 125 saturating transistor 179 causing transistor 177 to be off regardless of the voltage condition on terminal 47. This causes lead 211 to contain only the root note frequency.

Bus 197 is tied to input terminal 212 of NAND gate 189. Minor bar switch 194 is normally open causing input 213 to be open, allowing the signal on input terminal 212 to appear on third terminal 156 via NAND gate 189.

Bus 196 is tied to input 215 of gate 188, however, with switch 194 open the output of 190 is grounded and thus the signal on bus 196 is grounded via lead 214 and is prevented from appearing at the output of 188. Thus the major third frequency normally appears at terminal 156.

If switch 194 is closed input terminal 213 of NAND gate 189 is grounded preventing signal at input 212 from being passed to terminal 156. The input of 190 is also grounded causing the output of 190 to be open and allowing the signal on input terminal 215 to be passed to terminal 156 via gate 188 which represents the minor third frequency. Thus switch 194 controls whether the major or minor third frequency appears at terminal 156.

Bus 199 is tied to the seventh terminal 105. Whether a signal is present on terminal 105 is a function of the key selector buttons 170.

If all switches of 170 are out as shown terminal 105 is preventing defeating the seventh signal. If one of the switches of 170 is closed seventh signal may or may not appear on terminal 105 depending upon the condition of lines 200 through 205. If, for example, the CG switch of 170 is closed terminal 105 is connected to line 200 and 205. The sixth inverter of each I.C. package is connected to one of the lines 200 through 205 as shown. The sixth inverter, such as 176, has no connection to its input terminal. Thus if voltage is applied to terminal [169] *69* the output of 176 will be grounded, grounding line 200, which subsequently grounds terminal 105 via the CG♭ switch of 170, the seventh signal from sounding. With CG♭ switch closed terminal 105 will be grounded whenever a C,F #, F or B key switch is closed. When any other key switch is closed seventh signal will appear on terminal 105. This allows seventh chords to sound for the appropriate chord when a given musical key switch of 170 is selected. If, for example, GD♭ switch of 170 was closed lines 201 and 200 would ground terminal 105 whenever a C, F #, C # or G key switch was closed, preventing the seventh signal from sounding.

As stated previously, the system of the present invention is defeated when two or more key switches are closed simultaneously. Preventing signal from appearing on terminals 155, 156, 157, 158, 159 and 105 under these conditions is done by applying +5V to terminal B (FIG. 4). This voltage is developed from FIG. 2 as previously explained. When +5 is applied to B inverters 191, 187, 185 and 186 are caused to have their outputs grounded which defeats signal from the above stated terminals, defeating the entire automatic programming of the chords.

Since under this condition the rhythm generator may be still running, which provides a control signal to root-fifth terminal 47, B also saturates transistor 179 via resistor 181, preventing any control voltage on terminal 47 from affecting transistor 177 and thus causing undesirable transient effects from triggering dividers 192 and 193. When no keys are depressed no power is applied or dissipated by the twelve I.C. packages developing the chordal components.

The material hereinabove provided relates to the rhythm section of an electric organ. The following material relates the rhythm section to a melody section of the organ.

Figure 13A:
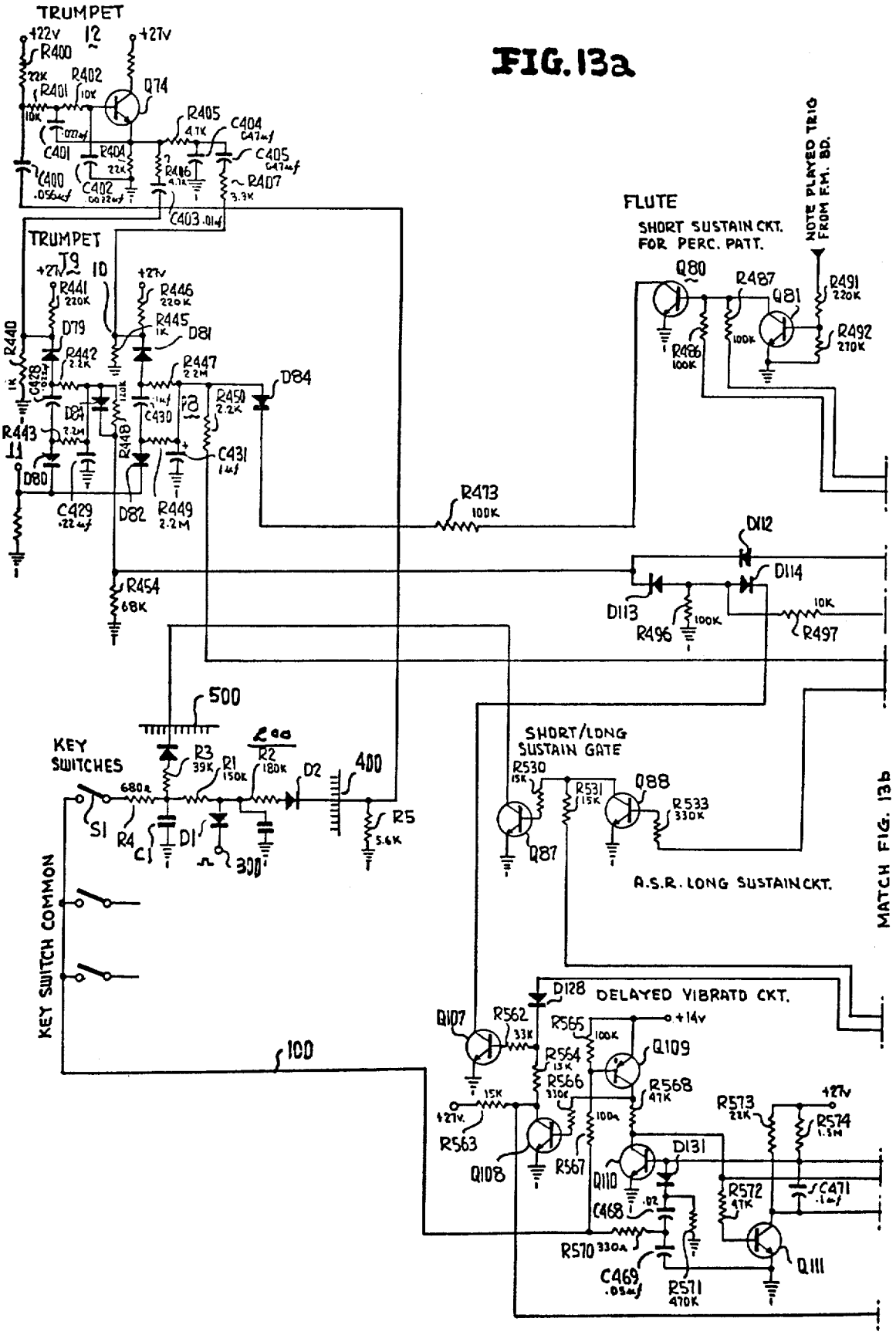
FIGS. 13a and 13b is a schematic circuit diagram of circuitry controlled by a manual solo keyboard, used with the system of FIG. 1.
Figure 13B:
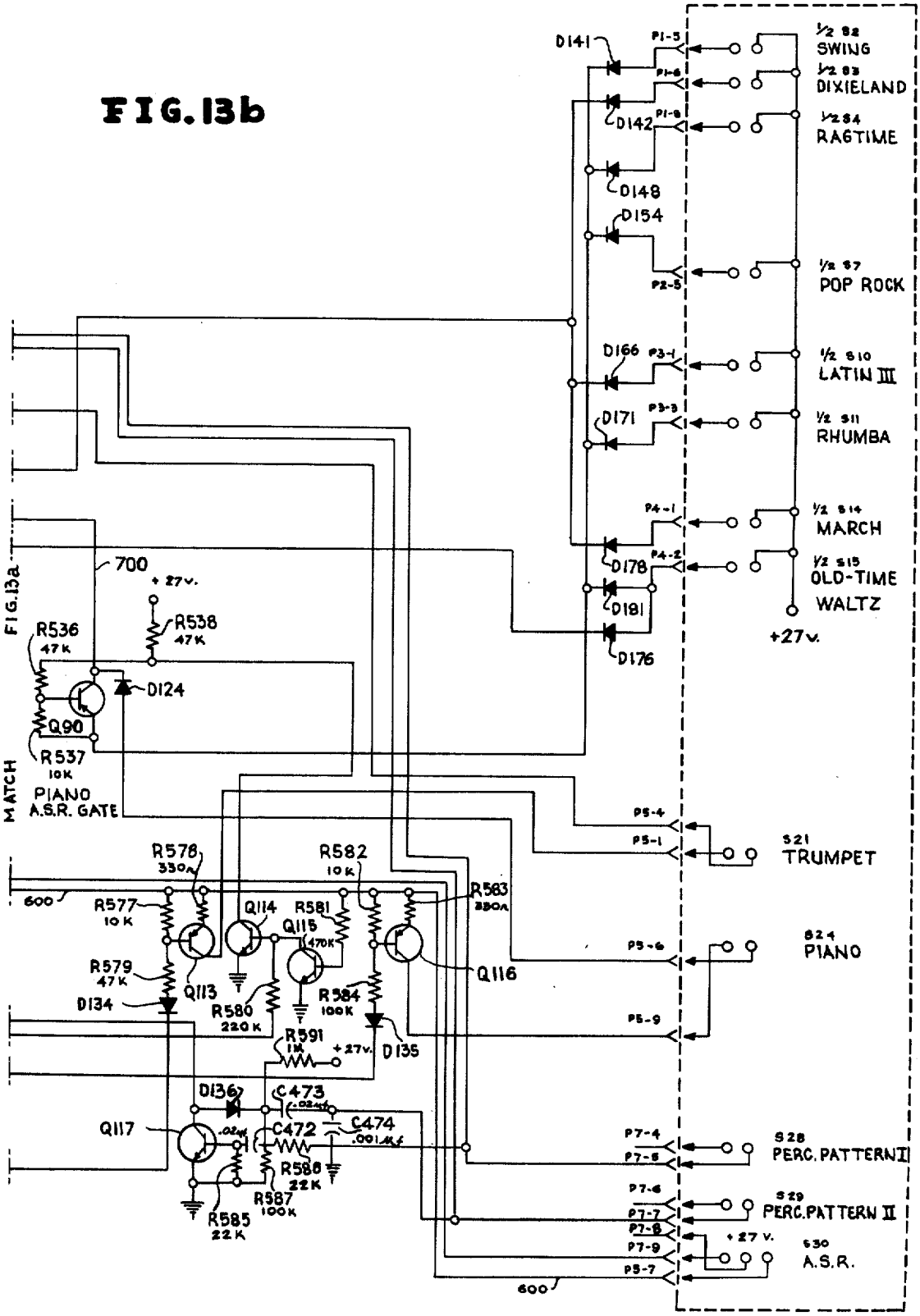

Referring to FIGS. 13a and 13b, when key switch S1 is closed plus voltage via lead 100 and transistor Q109 is supplied to an individual note gate 200. This allows the generator signal on terminal 300 to be passed through the gate composed of diodes D1 and D2 and resistor R2 and to appear on output signal bus 400. Capacitor C1 charges to the keying voltage and if bus 500 is not grounded will allow the signal through the gate to gradually decay in an experimental fashion after the switch S1 is opened. If bus 500 is grounded, the signal through the gate will quickly decay.

When a key switch is closed current through resistors R565 and R567 turn transistor Q109 on and thereby supply voltage to transistors Q110, Q111 and Q108. When a key switch is closed the voltage on bus 100 falls slightly causing a negative transient to be coupled via resistor R570, diode D131 and capacitor C468 to the base of transistor Q110 causing Q110 to turn off and allowing the voltage from the collector of Q109 to appear at the base of Q111 via resistors R568 and R572. This saturates Q111 and couples a negative transient to the base of Q110 via capacitor C471. Q110 will remain off until resistor R574 charges capacitor C471 to a value which will overcome the base emitter drop of Q110 turning Q110 on and Q111 off. Thus when a key is played a positive 10 ms pulse appears at the collector of Q110 and the collector of Q111 remains at ground for the same length of time.

If the ASR switch is as shown +27V appears on bus 600 providing supply voltage to transistors Q116, Q115, Q113, Q107 and Q108. Q115 is saturated causing Q114 to be off which in turn causes Q90 to be off and thus prevents Q90 from passing any voltage appearing at its emitter to be passed to the piano gate P8 via lead 700. In a similar manner Q107 is saturated via D128 grounding the cathode of D114 preventing any voltage from being passed to the trumpet gate T9 via resistor R497.

Since Q116 as supply voltage via lead 600 transistor Q116 will turn on for 10 ms every time a key is played due to its base being coupled to transistor Q111 via resistor R584, and diode D135. Thus a positive voltage 10 ms pulse appears at the collector of Q116 which is applied to the piano gate P8 via lead 700, diode D124 and piano switch S24, if the piano switch is closed. S24 is shown in the "off" or open position. This 10 ms pulse charges capacitor C431 and provides bias to the linear gate composed of diodes D81 and D82 via resistors R447 and R449, turning the gate on, and passing any signal which appears at its input to its output. After 10 ms, bias of gate P8 decays exponentially due to the discharge of capacitor C431, causing the signal to decay in a slow exponential fashion. Signal input to the gate P8 is received via filter 12 from signal bus 400. If bus 500 is grounded and a key is released before gate P8 has decayed the signal at the gate output will decay quickly, due to the short sustain time of note gate 200.

Thus piano gate P8 is pulsed with a 10 ms pulse every time a key switch is closed and gate 200 is turned on for as long as the key switch remains closed. The resulting signal envelope would appear as shown in FIG. 12a. Also when a key switch is closed and transistor Q109 turns on, Q108 turns on due to bias current via resistor R566. Q108 turns Q113 on via diode D134 and resistor R579. Q113 thus supplies voltage to trumpet gate T9 via trumpet switch S21 and diode D112, for as long as the key switch is closed. When Q113 turns on capacitor C429 is charged with a time constant of C429 and R448 and is selected to simulate a trumpet attack. When the key switch is released and Q113 turns off capacitor C429 primary discharge path is through diode D84 and resistor R454 to ground. This is a much faster discharge than that of gate 200 with bus 500 grounded. Also shown in FIG. 12a is the envelope of the trumpet for a key played and released. Thus the trumpet signal will appear on signal output terminal for as long as the key switch remains closed while the piano will gradually decay.

If the ASR switch is closed no supply voltage will appear on lead 600 and thus no trigger voltage will be available to the piano gate or the trumpet gate via the piano and trumpet switches even if they are closed.

Since there is no voltage on lead 600, transistor Q115 will be off, which allows transistor Q114 to become saturated for 10 ms every time a key switch is played, due to bias current via resistor R580 from the collector of transistor Q110. Transistor Q114 will then pulse Q90 if voltage is present at the emitter of Q90 which in turn provides a trigger pulse to piano gate 8 via lead 700. Whether voltage is present at the emitter of Q90 depends upon which rhythm switch is operated. If the Rhumba switch were closed +27V would appear at the emitter via diode D171 and the piano would be allowed to sound exactly in the same manner as previously described. If no voltage is present at the emitter the piano will not sound when a key switch is closed. As examples, it is shown that rhythm buttons Old Time Waltz, Rhumba, Pop Rock. Ragtime and Swing will supply voltage to Q90 when selected via diodes D181, D171, D154, D148 and D141, respectively. Thus the piano voice is automatically selected as a function of which rhythm is selected.

Since no voltage is present on lead 600 transistor Q107 is not provided with bias current via D128, but is still held in saturation due to bias current via resistors R562 and R564. However, whenever a key switch is closed and Q109 turns on Q108 turns on due to bias current via R566. Q108 shunts the bias current of Q107 causing Q107 to turn off. This in turn removes ground from the cathode of diode D114 which will then allow voltage to be applied to trumpet gate T9 via diode D113 and resistor R497 via certain of the rhythm buttons. Voltage will be supplied to resistor R497 via rhythm switches labelled Dixieland, Latin III and March and diodes D142, D166 and D178, respectively. Thus, the trumpet voice will be allowed to sound for certain rhythms. Additional voices can be controlled in the manner described, the description being exemplary.

When Old Time Waltz is selected and the piano is allowed to sound voltage is also applied to transistor Q88 via resistor R533 and diode [s] D176. If ASR swich is closed voltage is also applied to resistor R531 but is shunted to ground by Q88. This allows Q87 to be "off", which removes sustain bus [5] *500* from ground. Now when a key is played and released the piano voice will have a long sustain because of the long sustain of gate 200. This is not true for the other rhythm buttons which select the piano voice because Q88 will be off and Q87 will ground sustain bus 500.

Perc Pattern I switch will cause the piano to be reiterated by applying the strobe pulse of the rhythm generator to the note played detector circuitry via transistor Q117, causing a 10 ms pulse to be applied to the piano gate at the strobe pulse rate.

Perc Pattern II switch will cause a piano to be sounded in a particular rhythm, which is a function of what rhythm button is selected, by applying the ROM output pulse which appears on pin 20 to the note played detector via diode D136 and capacitor C473. Perc I and II buttons only affect the piano, and not the trumpet.

Since the strobe pulse and the ROM output pulse switch between +27V to +12V, transistor Q80 will be supplied with bias current via resistors R486 or R487 depending upon whether Perc I or Perc II switch is operated. If transistor Q80 is allowed to be saturated the piano gate 8 will have a shorter sustain than normal because of an additional discharge path of sustain capacitor C431 via diode D84 and resistor R473 and transistor 80, Q80 will be saturated only if Q81 is off. Q81 is off only when a note from the left hand automatic chord section is being played. The note played trigger pulse is +5V when no left hand rhythm or chord is played and is at ground when one of these keys is played.

Thus when a left hand key is played and the piano is played by holding down a key switch in the right hand the piano will be pulsed but the length of sustain will be shorter than normal, allowing the effect to be more distinctive than would be the case if the piano were allowed to have its regular long sustain, as provided by gate P8.

What I claim is:

1. In an electric organ an array of *playing* keys, means responsive to actuation of selected ones of said array of *playing* keys for sounding a triad chord, means responsive to actuation of the unselected ones of said array of *playing* keys for sounding a seventh chord, *musical* key selector switches, and means responsive to *actuation of* said *musical* key selector swtiches for selecting which of said *playing* keys shall be selected *ones of said playing* keys.

2. The combination according to claim 1, wherein is provided means for sounding said chords in one rhythm in response to actuation of one of said selected *playing* keys and in another rhythm in response to actuation of one of said unselected *playing* keys.

3. In an electronic organ, a keyboard, said keyboard including a set of solo keys and an octave of chord control keys, each of said chord control keys representing a root note, control means [, means] responsive to actuation of any one and only one of said chord control keys for calling forth a chord [, means responsive to said control means for selecting the chords called forth by said chord control keys] in all twelve musical keys, *said control means including manually operable musical key selector means for discriminately selecting seventh chords in response to actuation of predetermined ones of said chord control keys*, and means for disabling said control means in response to actuation of more than one of said chord control keys.

[4. The combination according to claim 3 wherein said control means are manually operable musical key selector means.]

5. The combination according to claim 3 wherein said chords are selectively major triad and dominant seventh chords and, wherein is included mechanical means for converting said major triad and dominant seventh chords to minor triad and minor seventh chords.

6. The combination according to claim 5, wherein is included means for initiating rhythmical sounding of said chords to start on a downbeat in response to actuation of one of said octave of chord keys and to stop in response to release of said one of said octave of keys.

7. The combination according to claim 5, wherein is provided means for automatically calling forth a first rhythm in response to calling forth a triad chord and a second diverse rhythm upon calling for a seventh chord.

8. An automatic chord device for an electronic organ having percussive and accompaniment voices, comprising an array of keys, a set of rhythm select switches, means responsive to actuation of only one key of said array of keys for sounding a musical chord, means responsive to actuation of one of said rhythm select switches for selecting a first rhythm pattern of a percussive voice and [another] *at least two other diverse* rhythm patterns *each* [of an] *for different* accompaniment [voice] *voices*, and means for concurrently sounding said chord [in said another rhythm] in said accompaniment [voice] *voices in said at least two other diverse rhythm patterns* and [for sounding said chord in] said percussive voice in said first rhythm *pattern*.

9. The combination according to claim 8, wherein said percussive voices are bass drum, snare drum, brush, cymbal, clave and accent and wherein said accompaniment voices are piano, banjo, rhythm guitar, electric guitar and bass guitar.

10. The combination according to claim 8, wherein said accompaniment voices are string instrument voices.

11. The combination according to claim 8, wherein is further included a set of seventh selector switches, and means responsive to selective actuation of said seventh selector switches for controlling which keys of said array of keys shall call forth a seventh chord and which shall call forth only a triad chord.

12. The combination according to claim 11, wherein is provided means responsive to actuation of any one of said array of said keys which calls forth a seventh chord for modifying the rhythmic [pattern] *sequence* of said *other diverse* rhythm patterns.

13. In an electronic organ system, an array of keys, means selectively responsive to actuation of any one of said keys for calling forth a musical chord of tones of selectively major and minor character and in a first rhythmic sequency, mechanically, operable means for converting said musical chord from a major chord to a minor chord and vice versa, and control means operative to convert said musical chord from a chord containing no seventh component to a chord containing a seventh component and for concurrently modifying said rhythmic sequence.

14. An electronic organ, comprising a clock for producing recurrent pulses, means responsive to said pulses for generating recurrent trains of spatially distributed pulses, a read only memory matrix having input terminals and output terminals, means applying said spatially distributed pulses to said input terminals, a plurality of keys, means for deriving a variety of patterns of output pulses from said output terminals in response only to selective actuation of a single one of said keys, and means for rhythmically sounding a musical [chords] *chord* in response to said patterns of output pulses such that plural [ones] *voices* of said musical [chords] *chord* sound in diverse rhythms concurrently.

15. The combination according to claim 14, wherein is provided means for adding seventh chord components to said chords at will.

16. The combination according to claim 15, wherein is provided means for varying said rhythmic patterns of said chords in response to operation of said last named means.

17. The combination according to claim 14, wherein is included means for playing in twelve diverse musical keys.

18. The combination according to claim 14, wherein said chords are all played in major keys and wherein is provided player operated means for converting major keys to minor keys.

19. The combination accordingly to claim 14, wherein is provided a keyboard having a group of playing keys, means responsive to playing of any one key of said group of playing keys for calling forth a major triad chord corresponding with that one key, and touch bar means for converting said major triad chord to a minor triad chord.

20. The combination according to claim 19, wherein s included a set of key selector switch actuators, means selectively responsive to said switches when actuated for determining which of said group of playing keys shall provide a seventh chord.

21. The combination according to claim 20, wherein s provided an output line for said chords, wherein said memory provides normally either a major triad or a dominant seventh chord, and touch bar means for converting said major triad to a minor triad and said dominant seventh to a minor seventh.

*22. In an electronic organ, an array of playing keys, means responsive to actuation of selected ones of said array of playing keys for sounding chords, means for selecting rhythmic patterns, means for sounding said chords in a selected rhythmic pattern in a first sequence of rhythm accompaniment voices in response to actuation of first predetermined selected ones of said array of playing keys, and for sounding said chords in said selected rhythmic pattern in a second sequence of rhythm accompaniment voices in response to actuation of second predetermined selected ones of said array of playing keys.*

*23. An electronic organ, comprising a clock for producing recurrent pulses, means responsive to said pulses for generating recurrent trains of spatially distributed pulses, a memory matrix having input terminals and output terminals, means applying said spatially distributed pulses to said input terminals, a plurality of keys, means for deriving a variety of patterns of output pulses from said output terminals in response only to selective actuation of a single one of said keys, and means for rhythmically sounding a musical chord in response to said patterns of output pulses such that plural voices of said musical chord sound in diverse rhythms concurrently.*

* * * * *